US011442927B1

(12) United States Patent
Mamidi et al.

(10) Patent No.: US 11,442,927 B1
(45) Date of Patent: Sep. 13, 2022

(54) STORAGE PERFORMANCE-BASED DISTRIBUTION OF DEDUPLICATED DATA TO NODES WITHIN A CLUSTERED STORAGE ENVIRONMENT

(71) Applicant: EMC IP Holding Company LLC, Hopkinton, MA (US)

(72) Inventors: Murthy Mamidi, San Jose, CA (US); George Mathew, Belmont, CA (US); Abhishek Rajimwale, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 16/588,852

(22) Filed: Sep. 30, 2019

(51) Int. Cl.
*G06F 16/00* (2019.01)
*G06F 16/23* (2019.01)
*G06F 16/215* (2019.01)
*G06F 16/22* (2019.01)

(52) U.S. Cl.
CPC ........ *G06F 16/2379* (2019.01); *G06F 16/215* (2019.01); *G06F 16/2246* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 2007/0220320 A1* | 9/2007 | Sen | G06F 11/1456 714/13 |
| 2012/0095968 A1* | 4/2012 | Gold | G06F 11/1456 707/652 |
| 2012/0117029 A1* | 5/2012 | Gold | G06F 11/1451 707/651 |
| 2014/0052694 A1* | 2/2014 | Dasari | G06F 16/23 707/654 |
| 2014/0059311 A1* | 2/2014 | Oberhofer | G06F 3/065 711/162 |
| 2016/0162366 A1* | 6/2016 | Oberhofer | G06F 16/2358 707/645 |
| 2017/0249213 A1* | 8/2017 | Slik | H03M 13/373 |
| 2017/0277596 A1* | 9/2017 | Kyathanahalli | G06F 16/27 |
| 2017/0277597 A1* | 9/2017 | Dillon | G06F 11/1453 |

* cited by examiner

*Primary Examiner* — Bai D Vu
(74) *Attorney, Agent, or Firm* — Dergosits & Noah LLP; Todd A. Noah

(57) ABSTRACT

Described is a system that provides the ability to distribute backup data according to performance characteristics associated with nodes that form a clustered storage environment. For example, the clustered storage environment may organize nodes into tiers that have certain storage performance-related characteristics such as read/write latency, deduplication processing efficiency, bandwidth, etc. Accordingly, the system may associate the backup data with an identifier for an appropriate storage performance tier. The identifier may then be utilized by the clustered storage environment to redirect storage operations to a node within the appropriate storage performance tier. Thus, the system allows for the distribution of backup data to particular storage performance tiers based on particular storage or workload requirements.

17 Claims, 7 Drawing Sheets

STORAGE PERFORMANCE-BASED DISTRIBUTION OF DEDUPLICATED DATA TO NODES WITHIN A CLUSTERED STORAGE ENVIRONMENT

TECHNICAL FIELD

This disclosure relates to managing deduplicated backup data, and more particularly, distributing backup data to nodes with varying storage characteristics within a clustered storage environment.

BACKGROUND

Clustered storage systems employ various techniques for distributing data across a set of nodes of a cluster. For example, incoming data may be divided into chunks that are distributed across the set of nodes. To balance the load across the cluster, systems employ various distribution methods such as round-robin techniques or weighted algorithms. However, when distributing data within a system that employs data deduplication, certain types of data may be associated with different storage access requirements or deduplication efficiency. Accordingly, storage performance and efficiency may not be optimized when distributing data to nodes having a uniform set of storage characteristics. Accordingly, there is a continued need to improve efficiency of deduplicated data storage within a clustered storage environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
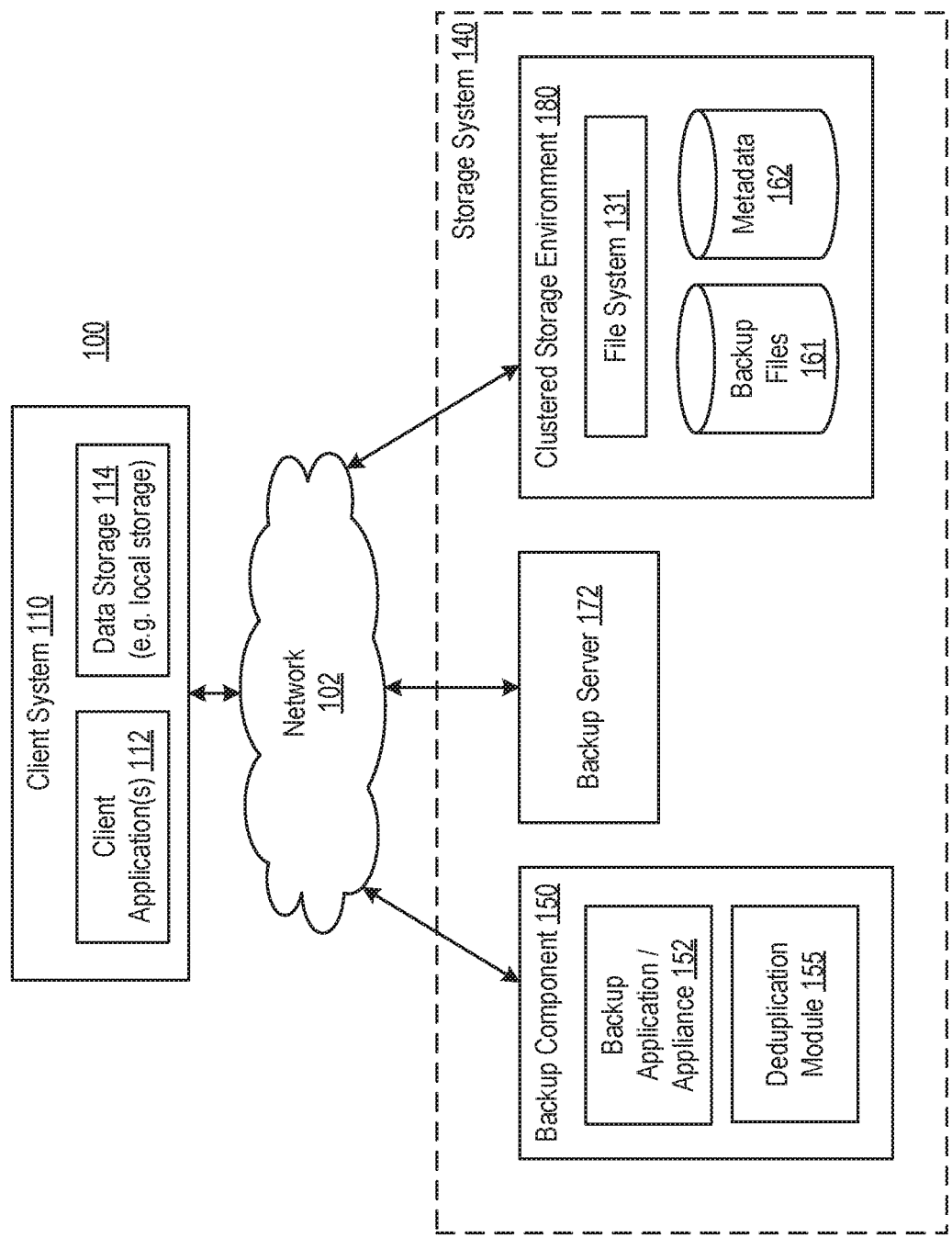
FIG. 1 is a block diagram illustrating an example operating environment for distributing backup data based on characteristics associated with nodes of a clustered storage environment according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that provides the ability to distribute backup data according to characteristics associated with nodes forming a clustered storage environment. The clustered storage environment may organize nodes into storage performance tiers, and each node within of a tier may be tuned (or optimized) for a particular type of workload. For example, the nodes of a particular tier may have certain storage performance-related characteristics such as read/write latency, deduplication processing efficiency, bandwidth, etc. Accordingly, the backup data may be redirected to an appropriate storage performance tier based on a particular workload requirement.

To provide such an ability, the system may analyze ingested data and determine an appropriate storage performance tier for storing backup data that is created as part of a backup process. The determined storage performance tier may then be associated with the backup data using an identifier that is relied upon by the clustered storage environment to distribute the backup data to a particular node. For example, the identifier may be provided as a tier placement tag that is provided as part of an operation that initiates storing data within the clustered storage environment. Accordingly, the clustered storage environment may reference such an identifier when performing storage related operations.

In addition, the system may provide a configuration that provides an efficient mechanism for organizing nodes into the various storage performance tiers. For example, the system may implement a structure for a file system such as a global namespace that allows for backup files to be independently associated with particular storage performance tiers. For example, the tier place tag (e.g. storage performance tier identifier) may be an attribute of a backup file that is stored as part of the file system. Accordingly, a backup file may be distributed or redistributed amongst the tiers without affecting the namespace entries of other backup files within the file system. Accordingly, the structure implemented by the file system allows for the system to efficiency scale the structure with additional tiers, or additional nodes within a tier, without unduly affecting file system entries for backup files of other nodes and/or tiers.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms such as the Data Domain™ data protection platform provided by Dell EMC™ Corporation, and associated systems, methods, and components, although use of this particular platform is provided only by way of illustration and is not required.

In some embodiments, the storage environment (or system) may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

More specifically, and with reference to FIG. 1, shown is a block diagram illustrating an example of an operating environment 100 for distributing backup data based on characteristics associated with nodes of a clustered storage environment according to one or more embodiments of the disclosure. As shown, the environment 100 may include a client system 110, and a storage (or target) system 140, which may include a backup system 150, backup server 172, and a clustered storage environment 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, storage system 140 may represent one or more components of a Data Domain Restorer (DDR)-based deduplication storage system, and the backup server 172 may be implemented in conjunction with a Data Domain deduplication storage server provided by Dell EMC for use with DDR storage devices. For example, the backup server 172 may be a stand-alone entity, or can be an element of the clustered storage environment 180. In some embodiments, the backup server 172 may be a Dell EMC Avamar server or a Dell EMC Networker server, although no particular server is required, and other backup and storage system configurations are contemplated.

The backup component 150, may include a backup application (and/or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage environment (e.g. as backup data 161). In some embodiments, the backup application 152 may cooperate with a backup client application of the client system 110 to back up client data to the clustered storage environment 180. A backup application 152 may also cooperate with a backup client application to restore backup data from the clustered storage environment 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage environment 180. However, in some embodiments, data deduplication may be performed partially, or entirely, within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage environment 180 (as further described herein) may store backup files 161 (or backup objects) within a one or more nodes (as further described herein). As shown, the clustered storage environment 180 may also store metadata 162 for (or associated with) the backup files 161, and one or more instances of a filesystem 131 that catalogs backup files and other data residing in the clustered environment. In one embodiment, the filesystem 131 may be formed from, or include, a namespace for all the backup files (e.g. global namespace) stored within the clustered storage environment 180 (e.g. all backup files associated with a particular customer, client, account, etc.). In general, the storage of backup files 161 may be configured to store client system 110 data backups that can be restored in the event of a loss of data.

Figure 2:
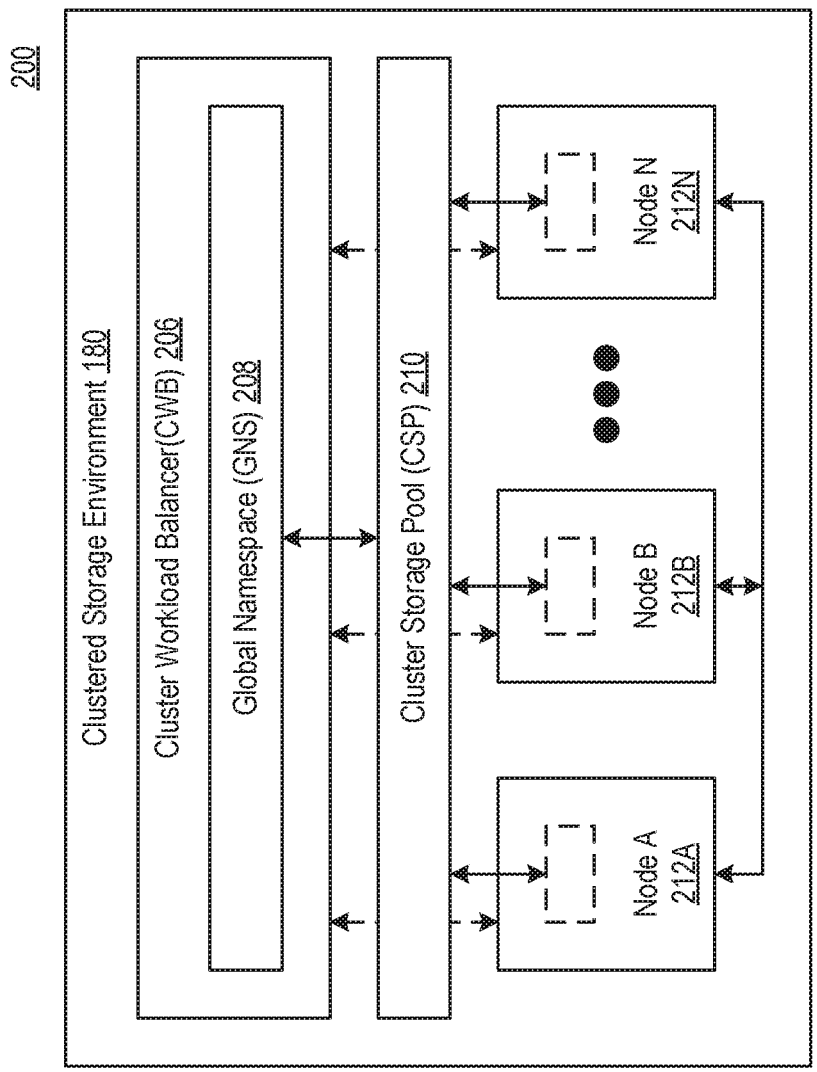
FIG. 2 is a block diagram illustrating an example clustered storage environment according to one or more embodiments of the disclosure.

FIG. 2 is a block diagram 200 illustrating an example clustered storage environment according to one or more embodiments of the disclosure.

The clustered storage environment (or system) 180 may represent a deduplicated cluster storage system (or service), distributed storage system (or service), distributed file system (or service), etc. As shown, the clustered storage environment 180 may include, or represent, a group of linked nodes (or storage nodes) 212A-N, which may be configured to share resources. The shared resources may include computing resources (e.g. computer processors and memory), storage resources (e.g. persistent data storage), and network resources (e.g. traffic bandwidth). Further, the sharing of any resource may entail virtualizing the resource in each node to create a logical pool of that resource that spans, and is made available to all nodes (e.g. nodes 212A-N), across the clustered storage environment 180. For example, when considering storage resources, the physical device (e.g. HDDs, SSDs, etc.) representative of the local storage resources on each node may be virtualized to form a globally-accessible cluster storage pool (CPS) 210. Accordingly, the CPS 210 may represent a logical pool of disk capacity formed from all storage resources across the clustered storage environment 180.

In some embodiments, a node 212 may represent a physical computing system dedicated to storing backup files, processing workloads, and other operations. For example, processing workloads may include processing service requests submitted to the clustered storage environment 180 such as receiving file operation requests delegated from the cluster workload balancer (CWB) 206, processing the file operation requests (e.g. directing/redirecting backup data, and/or storing backup data as further described herein), and returning file operation responses back to the CWB 206 based on results obtained from processing the file operation requests. It should be noted that a node 212 may perform other functionalities without departing embodiments of the disclosure.

In some embodiments, the clustered storage environment 180 may include a cluster workload balancer (CWB) 206. The CWB 206 may represent a physical computing system dedicated to distributing service traffic across the various nodes of the clustered storage environment 180. This distribution of service traffic (also referred as load balancing) may reduce individual node 212 workload, may prevent any one node from becoming a single point of failure, and may improve the responsiveness and availability of the deduplicated storage service provided by the clustered storage environment 180. To the extent of load balancing, the CWB 206 may include the following functionalities: monitoring and tracking resource availability, for any given point in time, across the various nodes, receiving file operation requests from the upstream components (e.g. backup component 150, backup server 172, etc.); selecting the best available nodes to process the file operation requests based on the tracked resource availability; delegating the file operation requests to the best available nodes for processing; receiving file operation responses from the best available nodes; and forwarding the file operation responses to the requesting components.

In some embodiments, the CWB 206 may also represent a single point of contact, for the clustered storage environment 180, with which components (e.g. of environment 100) may interface. In some embodiments, the clustered storage environment 180 may maintain a global namespace (GNS) 108, which may be managed by the CWB 206. The GNS 208 may refer to an abstraction that unifies the various local filesystems, maintained by the various nodes 212A-N across the clustered storage environment 180, into a single virtualized global filesystem. The single virtualized global filesystem may subsequently be presented to the components in order to simplify the management and accessibility of storage and/or data across the clustered storage environment 180, which may be aggregated in the form of the CPS 210.

Figure 3:
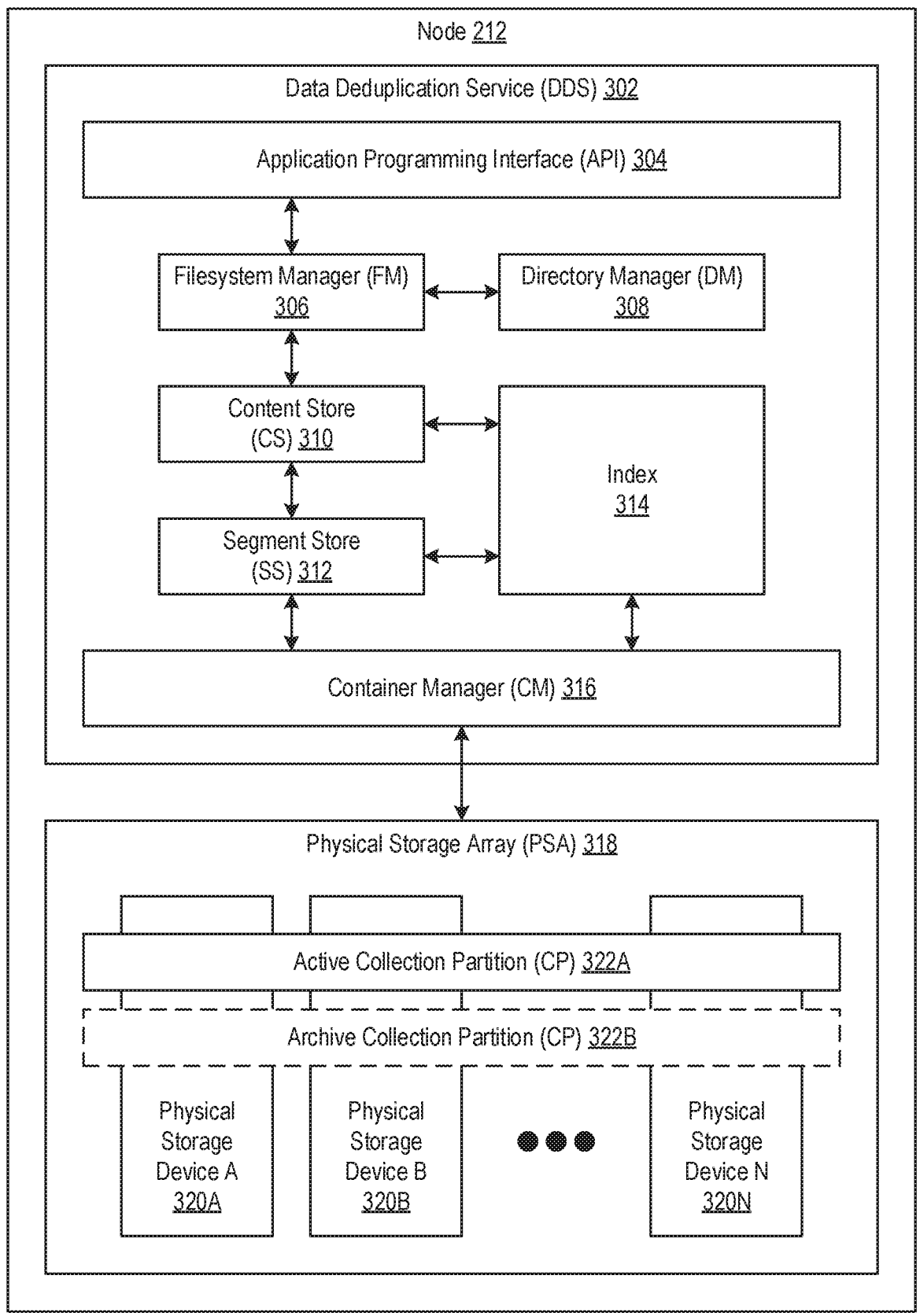
FIG. 3 is a block diagram illustrating an example node according to one or more embodiments of the disclosure.

FIG. 3 is a block diagram 300 illustrating an example node according to one or more embodiments of the disclosure. As shown a node 212 may include a data deduplication service (DDS) 302 operatively connected to a physical storage array (PSA) 318.

In some embodiments, the DDS 302 may represent a component that may be responsible for consolidating and/or retrieving data (e.g. backup files from the PSA 318). In some embodiments, the DDS 302 may perform such responsibilities while performing data deduplication. In some embodiments, the DDS 302 may include an application programming interface (API) 304, a filesystem manager (FM) 306, a directory manager (DM) 308, a content store (CS) 310, a segment store (SS) 312, an index 314, and a container manager (CM) 316. Each of these DDS 302 subcomponents is described below.

The API 304 may represent an interface through which external entities such as the cluster workload balancer (CWB) 206 and other nodes 212 in a cluster may interact with the DDS 302. Accordingly, the API 304 may employ a set of subroutine definitions, protocols, and/or tools directed to enabling communications between the DDS 302 and the external entities. For example, the API 304 may performing functionalities including: receiving file operation requests delegated from the CWB 206; extracting file operations and operation-pertinent arguments (OPA) from the file operation requests; invoking the FM 306 using the file operations and the OPA, to process the file operation requests; receive remote procedure calls (RPC) from the FM 306 for transmission to one or more specified other nodes; receive remote procedure reports (RPR) from other nodes in response to RPC transmitted beforehand; invoking the FM 306 using the RPR; receiving file operation responses from the FM 306; and transmitting the file operation responses, disclosing results (if any) concerning earlier delegated file operation requests, to the CWB. It should be noted that additional functionalities are also contemplated.

The FM 306 may represent a component responsible for the coordination of DDS 302 operations. To that extent, the FM 306 may include functionality to: receive file operations delegated to the node 212 for processing; invoke other DDS 302 subcomponents (e.g. the DM 308 and the CS 310) towards processing received file operations; issue remote procedure calls (RPC) to other (remote) nodes; and issue file operation reports based on results yielded from processing received file operations. In addition, the FM 306 may include functionality to maintain, lookup, and update a local redirection cache. In one embodiment, the FM 306 may include functionality to indicate which file segments (e.g. unique blocks or chunks of data) pertain to a file. These file segments may be identified as a list of fingerprints (or hashes) representative of the file segments.

The DM 308 may represent a component responsible for the management of files in one or more filesystems across the clustered storage environment 180. To that extent, the DM 308 may include functionality to maintain, traverse, and update one or more namespace trees. For example, a namespace tree may represent a hierarchical data structure directed to reflecting the way files and/or directories may be identified and stored in data storage (e.g. the PSA 318).

The CS 310 may represent a component responsible for the management of file content associated with various files consolidated in the PSA 318. To that extent, the CS 310 may include functionality to maintain, traverse, and update various segment trees. For example, a segment tree may refer to a Merkel tree, or a hierarchical data structure, for identifying and tracking the locations of file segments, pertinent to a single file, stored in the physical storage devices (320A-N) of the PSA 318. If the PSA 318 is formed from one physical storage device (320A-N), the locations of the pertinent file segments may be indicated through disk offsets. Alternatively, if the PSA 318 is formed from multiple physical storage devices (320A-N), the locations of the pertinent file segments may be indicated through physical storage device (320A-ON) identifiers in addition to disk offsets. Furthermore, the CS 310 may also include functionality to, at least in part, execute data deduplication on the node 212 by deconstructing files into file segments (also referred to as blocks or chunks).

The SS 312 may represent a component responsible for assessing whether new file segments, yielded from the CS 310, may already be stored. Should new file segments be stored already, metadata for those new file segments, rather than the new file segments themselves, may be stored to optimize storage space utilization. In conjunction with the CS 310, the SS 312 may include functionality to execute data deduplication operations on the node 212.

The index 314 may represent a data structure that may be used to locate stored file segments within one or more physical storage devices (320A-N) of the node 212. More specifically, the index 314 may include associations that map fingerprints (or hashes) to storage locations that consolidate the file segments that which the fingerprints represent.

The CM 316 may represent a component responsible for the management and tracking of containers. A container may refer to a logical grouping of compression regions consolidated in data storage (e.g. PSA 318). Each compression region, in turn, may encompass a compressed and/or archived data object that stores one or more file segments and their associated metadata within.

Returning to the node 212 components, in some embodiments, the PSA 318 may represent a collection of one or more physical storage devices (320A-N) on which various forms of information (e.g. backup files) may be stored and/or consolidated. Examples of a physical storage device (320A-N) may include, but are not limited to, a hard disk drive (HDD), a solid state drive (SSD), and network attached storage (NAS), etc. An active collection partition (CP) 322A may be implemented and span across at least a subset of the physical storage devices (320A-N) of the PSA 318. Accordingly, the active CP 322A may represent a logical storage pool wherein a collection of files stored therein dedupes only with other files in the logical storage pool. In some embodiments, an archive CP 322B may also be implemented and span across at least another subset of the physical storage devices (320A-N). In contrast to the active CP 322A, which may store frequently accessed and/or recently created files, the archive CP 322B may represent a logical storage pool wherein aged, seldom accessed files may reside and dedupe with other aged, seldom accessed files.

Figure 4:
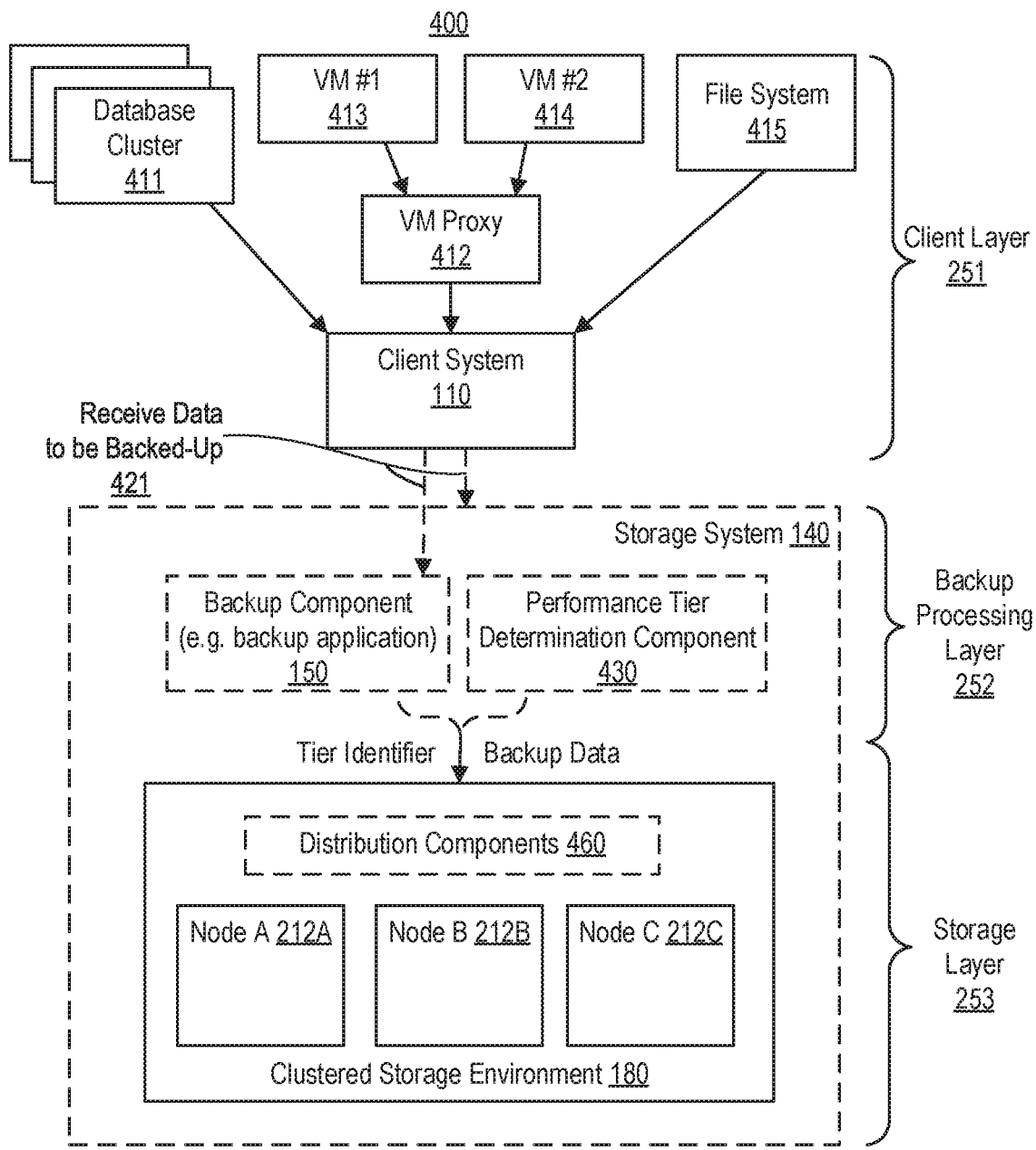
FIG. 4 is a block diagram illustrating an example interaction between components for distributing backup data based on characteristics associated with nodes of a clustered storage environment according to one or more embodiments of the disclosure.

FIG. 4 is a block diagram 400 illustrating an example interaction between components for distributing backup data based on characteristics associated with nodes of a clustered storage environment according to one or more embodiments of the disclosure.

As shown, a client system (or client server) 110 may be associated with one or more data sources (e.g. data sources 411-415). The data sources may be part of, or work in conjunction with, the client system 110. For example, the data sources may be part of a separate server, or part of a cloud storage infrastructure. Accordingly, the client system 110 and the data sources may be part of a client layer 251 that provides backup data (e.g. data to be backed-up) to a storage system 140 as shown in 421. The client system 110 may provide (or transmit, send, transfer, forward, etc.) the data to the storage system 140 as part of a backup process to initiate the creation of one or more backup files stored within the storage system 140. In some embodiments, the data may be sent to the storage system 140 at various time points as part of a backup schedule (e.g. hourly, daily, etc.).

The backup component 150 and the performance tier determination component 430 may be part of a backup processing layer 252. In some embodiments, the performance tier determination component 430 may be part of a backup application (e.g. backup application 152). The performance tier determination component 430 may analyze the received backup data and determine an initial storage performance tier to which the backup data may be stored. For example, backup data may be assigned to a performance tier based on attributes associated with the backup data. The attributes associated with the backup data may include type of data, access frequency, storage duration, deduplication ratio, and any other information that may determine or predict a workload associated with such backup data. The storage performance tiers may be formed from a set of nodes that have (or are tuned for) various storage performance characteristics as further described herein.

As shown, the clustered storage environment 180 may receive backup data along with an associated tier identifier (or storage performance tier identifier) such as a tier placement tag. In some embodiments, the backup component 150 may provide (e.g. transmit, send, transfer, inject, input, etc.) the storage performance tier identifier to the clustered data storage environment 180. The storage performance tier identifier may be received at the same time as the backup data (e.g. as part of the data, or as an input to an operation), or at a different time from when the backup data is received by the clustered storage environment 180.

As shown, the clustered storage system 180 may include the storage nodes 212 (e.g. storage nodes 212A-C), and related components that may form a storage layer 253. In some embodiments, distribution components 460 may redirect the backup data to a node of the appropriate storage tier based on the particular storage performance tier identifier. The distribution components 460 may work in conjunction with, or be a part of, nodes 212. For example, the distribution components 460 may be part of a component stack (e.g. software stack) that may include one or more of the cluster workload balancer (CWB) 206, filesystem manager 306, API 304, etc. In one embodiment, the distribution components 460 may include an API or plug-in, that acts as a layer that the backup component 150 (e.g. via a backup application 152) may access to perform operations as described herein with components of the clustered storage environment 180.

The clustered storage system 180 may receive the storage performance tier identifier in various ways. In some embodiments, the storage performance tier identifier may be received as an input to an operation that writes (or creates) a backup file to the clustered storage environment 180. For example, the input may include the storage performance tier identifier as an argument to an operation (e.g. function, method, class, etc.) that initiates the creation of a backup file to the clustered storage environment 180. In some embodiments, the backup component 150 may initiate creation of a backup file using an API provided by the clustered storage environment 180. For example, the clustered storage environment 180 (e.g. as part of DDS 302) may provide an API (e.g. API 304) to access a storage layer (or protocol) to which the storage performance tier identifier may be passed along with the backup data (or portion thereof) to be used to create a backup file. In some embodiments, the storage performance tier identifier may be received directly to a filesystem or namespace managed by the clustered storage environment 180. For example, the backup component 150 may provide the storage performance tier identifier by setting (or specifying) the identifier as a file attribute of a backup file. In another example, the backup component 150 may provide the storage performance tier identifier by specifying the identifier as part of metadata (e.g. metadata attribute, metadata file, index, database, etc.) associated with a backup file. In some embodiments, the metadata may include some form of an index (e.g. index 314) that is managed, maintained, and/or referenced by the clustered storage environment 180. In some embodiments, the index may be stored on a specialized node (e.g. index node) that may be referenced when performing file operations (e.g. reading/writing backup files). For example, the index node may include a separate (or independent) specialized node that is provided to primarily (or exclusively) store index information instead of backup data or files as with other nodes.

In some embodiments, the storage performance tier placement tag may also be provided as part of a set of tags. For example, the tier placement tag may be provided along with a node placement tag (e.g. data source identifier). The node placement tag may allow the system to store the backup data to a node that already stores related data (e.g. previous generations of the backup data). To create node placement tag, the backup component 150 may obtain data source information associated with the received data from the client system 110. The data source information may include any form of information that may be used (directly or indirectly) to create an identifier (or unique identifier) for a data source. For example, the data source identifier may include a device (or host) address (e.g. IP, network, or MAC address, etc.), an identifier (e.g. VM ID, database ID, storage ID, etc.), or other form of identifier (e.g. device name, customer ID, client ID, etc.). For example, the data to be backed-up (e.g. application data, operating system data, database records or objects, etc.) may originate from one than one VM (e.g. VMs 413 and 414) via a VM Proxy 412, and therefore, the data source identifier may include the particular VM ID (e.g. VM ID for VMs 413 or 414) instead of the VM ID for VM Proxy 412. As another example, as shown Cluster Database 411 may include several databases (or databases instances), and accordingly, the data source identifier may be a database ID for a particular database or instance within the cluster. Thus, in some embodiments, a tier placement tag and a node placement tag may be provided together to allow the clustered storage environment 180 to store related data together on the same node and within an appropriate storage performance tier. As described, backup data may be stored on particular nodes that are organized into storage performance tiers, an example of such storage performance tiers are further described with reference to FIG. 5.

Figure 5:
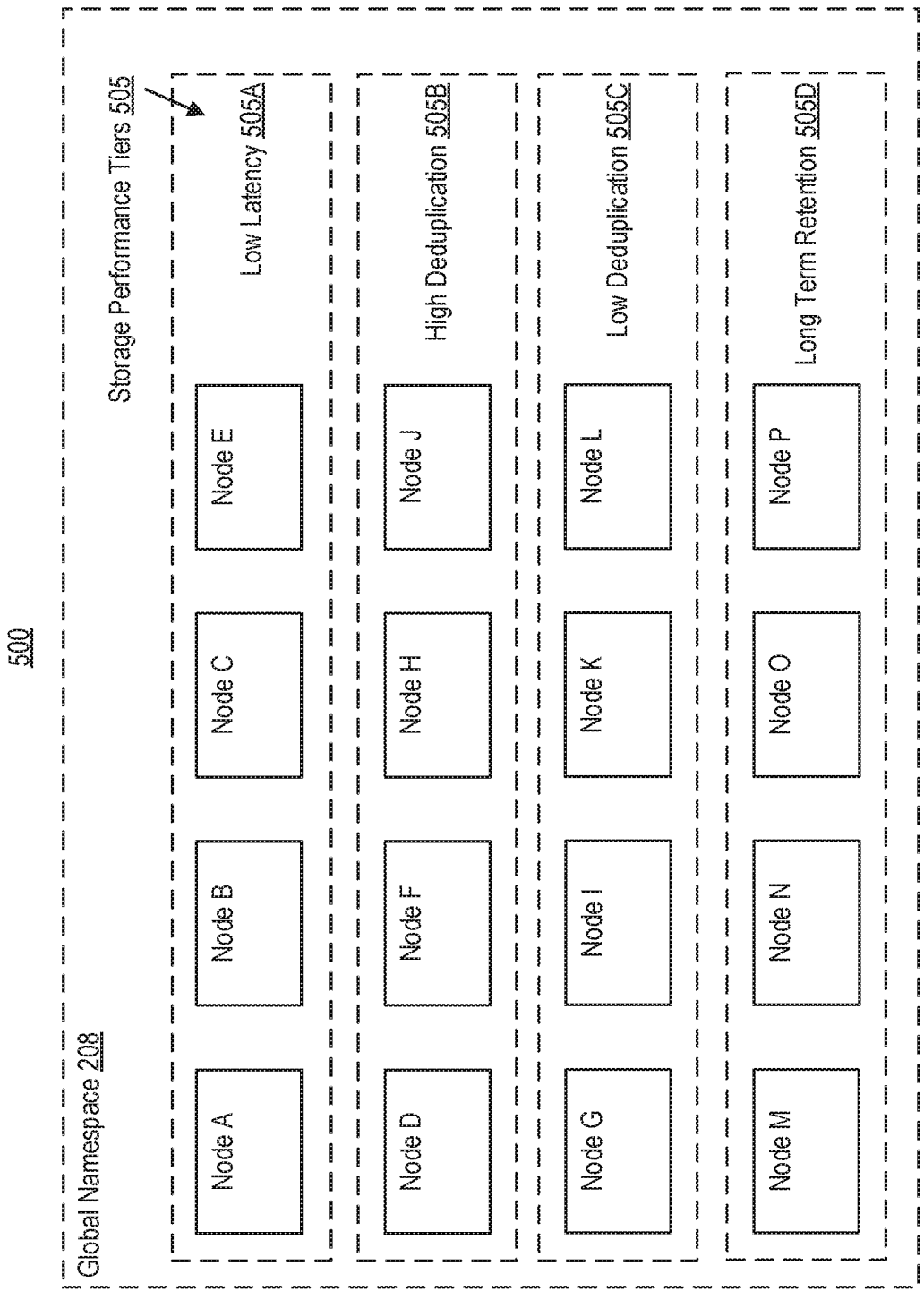
FIG. 5 is a block diagram illustrating an example set of nodes organized into a set of storage performance tiers according to one or more embodiments of the disclosure.

FIG. 5 is a block diagram 500 illustrating an example set of nodes organized into a set of storage performance tiers according to one or more embodiments of the disclosure. Accordingly, shown is a representation of a set of nodes (e.g. nodes 212) including Nodes A-P that are organized into a set of storage performance tiers (or classes, categories, etc.) 505. In this example, the tiers may include a low latency storage performance tier 505A, a high deduplication storage performance tier 505B, a low deduplication storage performance tier 505C, and a long term retention storage performance tier 505D. Accordingly, each of the nodes within a particular storage tier 505 may be tuned (or customized, specialized, optimized, etc.) in a manner corresponding to the storage performance tier 505. For example, the capabilities of the physical components (e.g. physical storage devices 320) underlying the nodes of the tier may be associated with certain storage-related characteristics (or proprieties, attributes etc.). By way of example, nodes within the low latency storage performance 505A, may be associated with solid-state drive (SSD) storage components, tuned for a larger data and/or metadata cache, and configured to work with a fixed data segment size. As another example, nodes within the high deduplication storage performance tier 505D, may be associated with hard disk drive (HDD) storage components, turned for larger compression, and configured to work with a variable data segment size. Nodes within the long term retention storage performance tier 505C, may be associated with cloud-based storage components (or services), may be tuned to store a smaller amount of metadata, and configured to store backup data as cloud-based storage objects.

It should be noted that the storage performance tiers shown are just examples, and additional types of storage tiers, nomenclature, or categorization is contemplated. However, in general, the system provides an efficient mechanism to categorize nodes in various categories (or tiers) based on the storage performance (or characteristics, properties, attributes, etc.) provided by the nodes and/or the underlying physical storage devices associated with the nodes.

As shown, a global namespace 208 may be used as, or part of, a file system to represent the organization of the nodes into storage performance tiers 505. The global namespace 208 may be implemented in any suitable manner. In one embodiment, the global namespace may be an abstraction using linked namespace trees to represent the distribution of backup files stored by the set of nodes. For example, a namespace tree may represent a hierarchical data structure for implementing a filesystem namespace. In one embodiment, the namespace tree may represent a hierarchical data structure dedicated to indexing and tracking backup files across the set of nodes. For example, the namespace tree may be represented as a B+ tree.

In some embodiments, each backup file may be associated with a storage performance tier identifier (e.g. tier placement tag) that is stored as an attribute of the backup file. For example, the storage performance tier identifier may determine the initial placement of a backup file to a node within a particular storage performance tier. The system (e.g. backup component 150) may set the storage performance tier identifier per backup file, or a collection (or set) of backup files such as directory or mount point. Accordingly, backup files created as part of the collection (e.g. as part of a subdirectory) may inherit the particular storage performance tier identifier.

In some embodiments, the global namespace 208 allows the backup files to be independently associated with particular storage performance tiers. For example, the storage performance tier identifier may be an attribute of a backup file that is stored as part of an independent and/or self-contained component of the namespace tree. For example, information (e.g. unique identifier for backup files, storage location, attributes, etc.) associated with a record (or entry) for a backup file may be stored as part of a self-contained component of the namespace tree. In addition, records for backup files of a particular node, or a set of nodes of a particular storage performance tier, may be self-contained by being stored as an independent limb of the namespace tree. As a result, updates to information associated with a particular record for a backup file (e.g. attributes identifying an associated node and/or storage performance tier) may be updated without affecting entries of the namespace tree for other backup files. Accordingly, a backup file may be distributed or redistributed amongst the tiers independently within the namespace.

Figure 6:
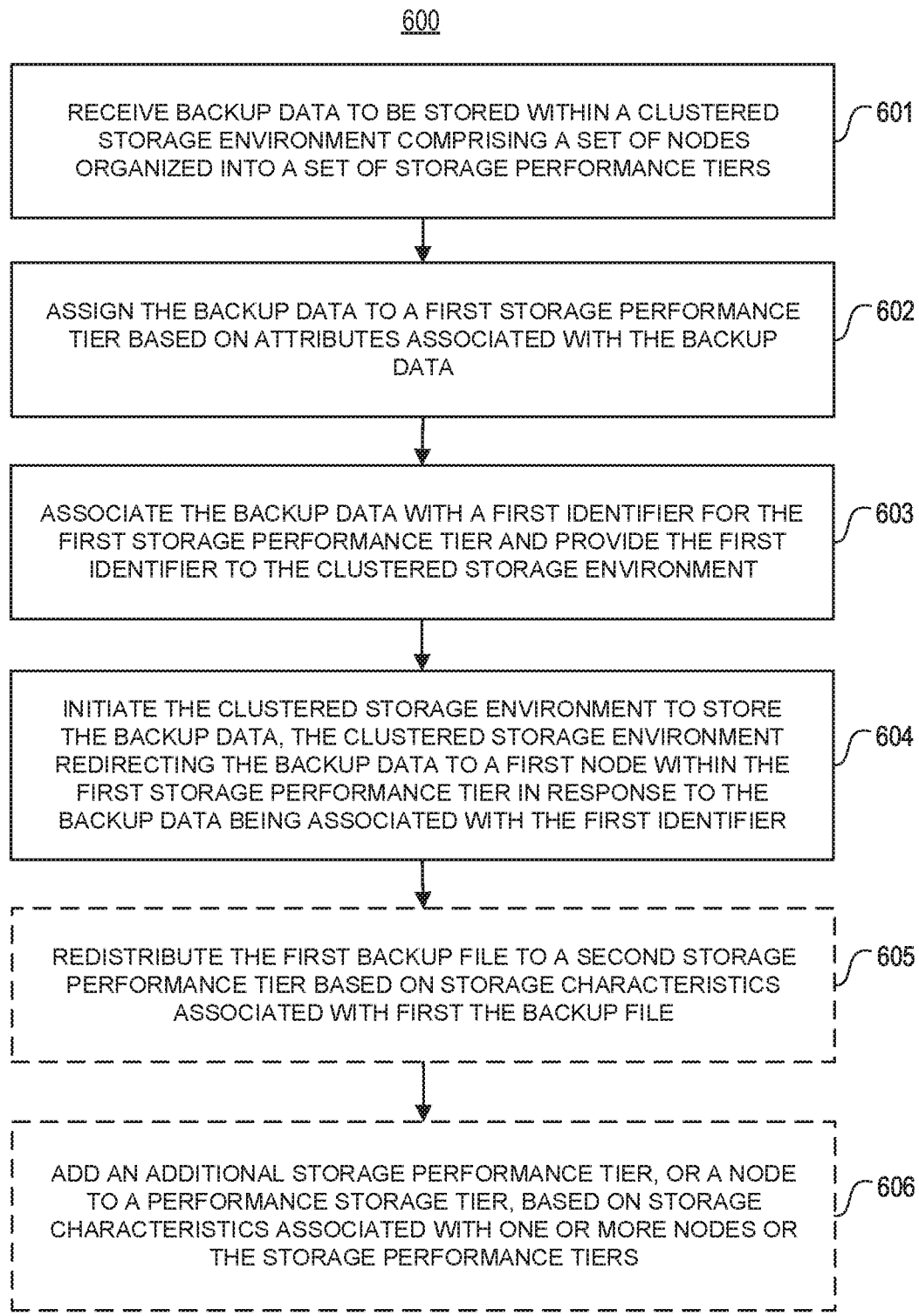
FIG. 6 is a flow diagram illustrating an example method of distributing backup data to a node within a particular storage performance tier according to one or more embodiments of the disclosure.

FIG. 6 is a flow diagram illustrating an example method of distributing backup data to a node within a particular storage performance tier according to one or more embodiments of the disclosure. Process 600 may use processing logic, which may include software, hardware, or a combination thereof. For example, process 600 may be performed by a system including one or more components described in operating environment 100 (e.g. storage system 140, clustered storage environment 180, node 212, etc.).

In 601, the system (e.g. storage system 140) may receive backup data to be stored within a clustered storage environment (e.g. clustered storage environment 180). As described, the clustered storage environment may be formed from a set of nodes (e.g. nodes 212) organized into a set of storage performance tiers (e.g. storage performance tiers 505). In some embodiments, nodes and/or the underlying physical storage devices (physical storage devices 320) associated with a node may have certain characteristics (or attributes, properties, capabilities, etc.) related to storage performance. For example, storage performance characteristics may include storage capacity, I/O per second (IOPS), bandwidth, latency, access times, memory availability (e.g. cache size and/or speed), amount of metadata, energy usage, or any other characteristics that may affect storage performance. For example, a storage performance tier associated with high performance (e.g. a low latency storage performance tier) may be comprised of SSD storage components. Whereas, a performance tier associated with long term data retention (or archival data storage) may be comprised of higher capacity or cost effective components such as HDD storage components, or cloud-based storage services. In one embodiment, the set of storage performance tiers may include one or more of a low latency storage tier (e.g. 505A), a high deduplication storage tier (e.g. 505B), a low deduplication storage tier (e.g. 505C), and a long term retention storage tier (e.g. 505D), although other types of storage tiers and classifications are contemplated.

In some embodiments, the backup data may be received from a client system (e.g. client system 110) as part of a backup process (or operation). For example, a backup component 150 (or backup application/appliance 152) may receive the backup data from a client system, and the backup component 150 may initiate storage of the backup data to the clustered storage environment.

In 602, the system may assign the backup data to a particular storage performance tier based on attributes (or characteristics, properties, etc.) associated with the backup data. For example, the system may assign the backup data to a first storage performance tier based on attributes associated with the backup data. In one embodiment, assigning the backup data to a storage performance tier may include retrieving (or obtaining, parsing, etc.) storage information associated with the backup data (e.g. data access counts), determining a set of attributes associated with the backup data based on the retrieved information, and assigning an appropriate storage performance tier based on the determined set of attributes.

The attributes associated with the backup data may include any information (or ques) that may be analyzed to determine or predict a workload or storage efficiency associated with the backup data. For example, the attributes may include the type of data, access frequency, storage duration, deduplication ratio, and any other attributes or characteristics that may. For instance, the type of backup data may be used to predict a storage efficiency associated with the backup data. For example, the system may determine the backup data is derived from a log file, which likely includes large amounts of unique data, and therefore, not highly deduplicable. Accordingly, the system may assign (or associate) the backup data to a low deduplication storage performance tier. As another example, the system may obtain attributes associated with the backup data and determine the data is marked (or flagged) as archival data. Accordingly, the system may assign the backup data to a long term retention deduplication storage performance tier.

In 603, the system may associate the backup data with an identifier for the assigned storage performance tier. For example, the system may associate the backup data with a first identifier for the first storage performance tier. Accordingly, in one embodiment, the system may provide the identifier to the clustered storage environment. For example, providing the first identifier to the clustered storage environment may include storing the first identifier as an attribute of a first backup file storing the backup data on the first node within the first storage performance tier. In some embodiments, providing the first identifier to the clustered storage environment may also include providing the first identifier as an input (e.g. argument) to an operation for initiating the clustered storage environment to store the backup data. For example, the operation (e.g. write operation) may initiate storing the backup data to the clustered storage environment as described in 604.

In some embodiments, the identifier for the assigned storage performance tier may be provided as a tier placement tag that is associated with the backup data. The tier placement tag may also be provided as part of a set of tags. For example, the tier placement tag may be provided along with a node placement tag (e.g. data source identifier). The node placement tag may allow the system to store the backup data to a node that already stores related data (e.g. previous generations of the backup data). Accordingly, in some embodiments, the use of a tier placement tag along with a node placement tag allows the system to store related data together on the same node and within an appropriate storage performance tier.

In 604, the system may initiate the clustered storage environment to store the backup data. For example, the system may initiate an operation to write the backup data as a backup file (or object) to the clustered storage environment. Accordingly, in one embodiment, the clustered storage environment may redirect a write operation for the backup data to a first node within the first storage performance tier in response to the backup data being associated with the first identifier. For example, the system may redirect a backup file write operation to a node within a low latency storage performance tier in response to the backup data being associated with an identifier of the low latency storage performance tier.

As described, when performing file operations, the system may rely on an efficient file system structure that organizes nodes into the various storage performance tiers. For example, the system may implement a global namespace (e.g. global namespace 208) that allows for backup files to be independently associated with particular storage performance tiers. As described, the global namespace may be maintained by the clustered storage environment for all the backup files stored by the set of nodes. In one embodiment, the system may initiate storing the first identifier as part of an entry to a global namespace for a first backup file storing the backup data on the first node. For example, the tier placement tag (e.g. storage performance tier identifier) may be an attribute of a backup file that is stored as part of the file system. Accordingly, a backup file may be distributed or redistributed amongst the tiers without affecting the namespace entries of other backup files within the file system.

After initially storing the backup data, the system may also periodically redistribute (or migrate) backup files based storage characteristics associated with the backup files.

Accordingly, in 605, the system may redistribute the first backup file to a second storage performance tier based on storage characteristics associated with the backup files. For example, the system may determine storage characteristics associated with a first backup file storing the backup data on the first node within the first storage performance tier. Based on the determined storage characteristics associated with the first backup file, the system may redistribute the first backup file to a second node within a second storage performance tier. For example, the system may dynamically redistribute data based on a storage characteristics such as type of data, I/O operations, storage duration, etc. For example, the system may initiate a redistribution of the first backup data to the second storage performance tiers in response to an analysis of the I/O operations associated with the first backup files. In some embodiments, the system may maintain (or record, store, etc.) statistical (or historical) information related to I/O operations associated with backup files. Accordingly, in one embodiment, the system may redistribute the first backup file to the second storage performance tier (e.g. low latency storage performance tier) based on the first backup file being associated with a high access frequency. Accordingly, in some embodiments, determining storage characteristics associated with the first backup file may include determining the first backup file is associated with a high access frequency, and in response, the system may redistribute the first backup file to a second node on the second storage performance tier which is associated with a lower latency than the first storage performance tier. Similarly, backup files that are accessed less frequently may be moved to a long term retention storage performance tier. In some embodiments, a monitoring component may reassess a current distribution of backup files amongst the tiers, and initiate a redistribution as needed. For example, the system may reassess the distribution in response to satisfying a time interval, or satisfying certain criteria such as a frequency threshold, or other characteristic that may trigger a process to initiate redistribution.

In addition, in response to the redistribution, the system may update the global namespace to associate the first backup file with the second storage performance tier without altering any existing global namespace entries for other backup files. For example, as described, the storage performance tier identifier may be an attribute of a backup file that is stored as part of an independent and/or self-contained component of a namespace tree.

In some embodiments, the system may also scale the tiered storage environment as necessary.

Accordingly, in 606, the system may add an additional storage performance tier, or an additional node to a storage performance tier based on storage characteristics associated with nodes or the storage performance tiers. For example, the storage characteristics may include information related to storage capacity, bandwidth, memory, CPU usage, etc., and may be associated with nodes within a tier, or the storage performance tiers themselves.

In some embodiments, the system may scale the storage configuration in a horizontal manner by adding additional nodes to a particular tier. For example, the system may determine a storage capacity of the first storage performance tier has reached a predetermined threshold or capacity, and in response, provision (or add, allocate, etc.) an additional node to the first storage performance tier. For example, the storage characteristics may indicate the storage capacity of the storage performance tier has reached a predetermined threshold. To reflect the addition of a node to a tier, the system may update the global namespace to include an additional limb on a namespace tree that corresponds to the additional node without altering any existing global namespace entries for other backup files.

In addition, in some embodiments, the system may scale the storage configuration in a vertical manner by adding additional storage performance tiers to the set of tiers. For example, the system may determine an additional storage performance tier is required, and in response, provision (or add, allocate, etc.) an additional set of nodes to create an additional storage performance tier. In addition, the system may update the global namespace to include an additional branch (or tree) on a namespace tree for the additional nodes without altering any existing global namespace entries for other backup files.

Accordingly, the structure implemented by the file system may allow the system to efficiently scale the tier structure without unduly affecting file system entries for backup files of the other nodes and/or tiers.

As noted, the operations (or steps) shown in the above processes are not necessarily performed in the order indicated and may be performed in parallel, as a single operation, or as multiple operations. For example, the system may provide the first identifier to the clustered storage environment before, concurrently with, or after, initiating the clustered storage environment to store the backup data.

Accordingly, embodiments described herein may provide an efficient technique for distributing backup data according to storage performance characteristics associated with nodes of a clustered storage environment.

Figure 7:
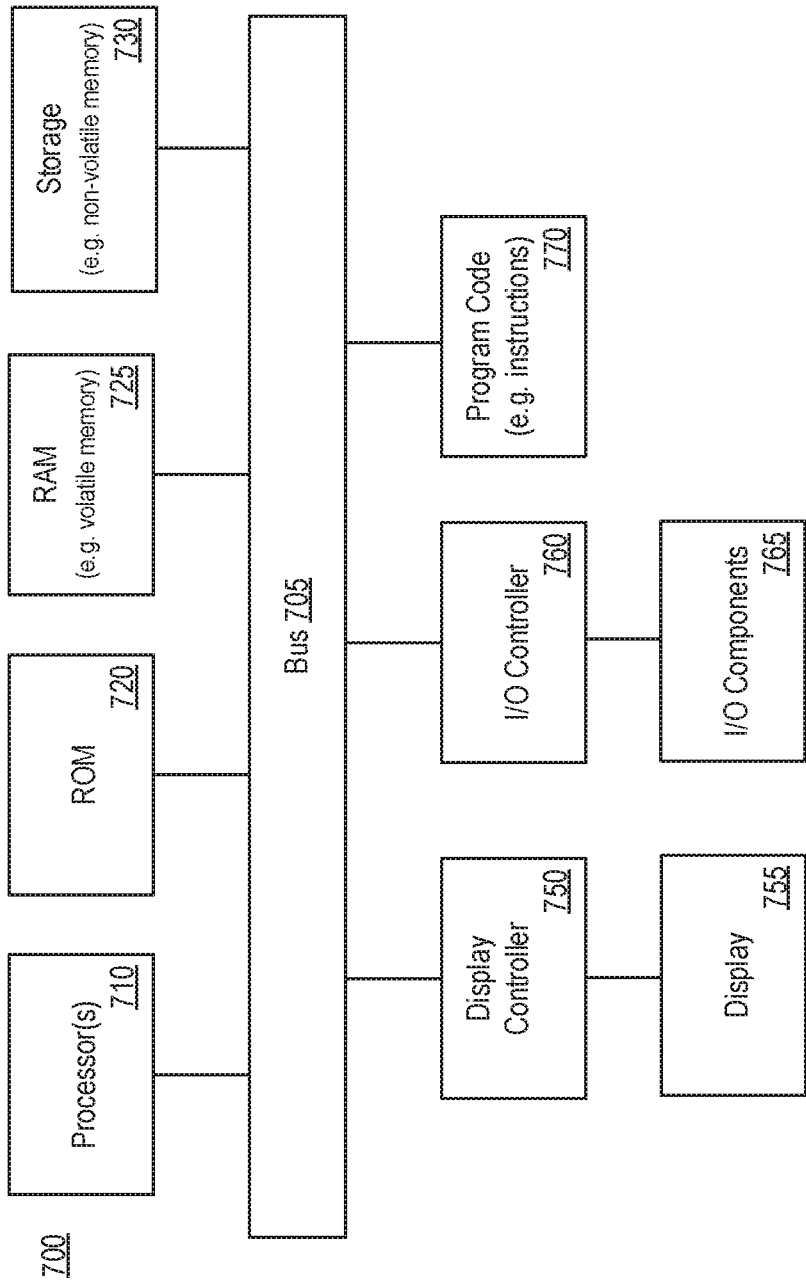
FIG. 7 is a block diagram illustrating an example of a computing system that may be used in conjunction with one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems (e.g. storage system 140, clustered storage environment 180, node 212, CWB 206, CSP 210, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. storage system 140, clustered storage environment 180, node 212, CWB 206, CSP 210, etc.). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processor; and
   a non-transitory computer readable medium storing a plurality of instructions, which when executed, cause the one or more processors to:
   receive backup data to be stored within a clustered storage environment, the clustered storage environment comprising a set of nodes organized into a set of storage performance tiers;
   assign the backup data to a first storage performance tier based on at least one of a predicted workload or a predicted storage efficiency associated with the backup data, the predicted workload or the predicted storage efficiency being determined based on attributes associated with the backup data, the attributes including at least one of type of data, access frequency, storage duration, or deduplication ratio associated with the backup data;
   associate the backup data with an identifier for the first storage performance tier and provide the identifier to the clustered storage environment;
   initiate the clustered storage environment to store the backup data, the clustered storage environment redirecting a write operation for the backup data to a first node within the first storage performance tier based on the identifier provided to the cluster storage environment;
   redistribute a first backup file storing the backup data on the first node within the first storage performance tier to a second node within a second storage performance tier based at least one of type of data, access frequency, or storage duration of the first backup file; and
   update a global namespace to associate the first backup file with the second storage performance tier without altering any existing global namespace entries for other backup files.

2. The system of claim 1, wherein the set of storage performance tiers includes one or more of a low latency storage tier, a high deduplication storage tier, a low deduplication storage tier, and a long term retention storage tier.

3. The system of claim 1, wherein the plurality of instructions, when executed, further cause the one or more processors to:
   initiate storing the identifier as part of an entry to the global namespace for the first backup file storing the backup data on the first node, the global namespace maintained by the clustered storage environment and storing entries for all backup files stored on the set of nodes.

4. The system of claim 1, wherein the redistributing the first backup file includes determining the first backup file is associated with a high access frequency, and wherein the second storage performance tier is associated with a lower latency than the first storage performance tier.

5. The system of claim 3, wherein the plurality of instructions, when executed, further cause the one or more processors to:
   determine a storage capacity of the first storage performance tier has reached a predetermined threshold;
   provision an additional node to the first storage performance tier; and
   update the global namespace to include an additional branch of a namespace tree for the additional node without altering any existing global namespace entries for other backup files.

6. The system of claim 1, wherein providing the identifier to the clustered storage environment includes providing the identifier as an input to an operation for initiating the clustered storage environment to store the backup data.

7. The system of claim 1, wherein providing the identifier to the clustered storage environment includes storing the identifier as an attribute of a first backup file storing the backup data on the first node within the first storage performance tier.

8. A method comprising:
   receiving backup data to be stored within a clustered storage environment, the clustered storage environment comprising a set of nodes organized into a set of storage performance tiers;
   assigning the backup data to a first storage performance tier based on at least one of a predicted workload or a predicted storage efficiency associated with the backup data, the predicted workload or the predicted storage efficiency being determined based on attributes associated with the backup data, the attributes including at least one of type of data, access frequency, storage duration, or deduplication ratio associated with the backup data;
   associating the backup data with an identifier for the first storage performance tier and provide the identifier to the clustered storage environment;
   initiating the clustered storage environment to store the backup data, the clustered storage environment redirecting a write operation for the backup data to a first node within the first storage performance tier based on the identifier provided to the cluster storage environment;
   redistributing a first backup file storing the backup data on the first node within the first storage performance tier to a second node within a second storage performance tier based at least one of type of data, access frequency, or storage duration of the first backup file; and
   updating a global namespace to associate the first backup file with the second storage performance tier without altering any existing global namespace entries for other backup files.

9. The method of claim 8, wherein the set of storage performance tiers includes one or more of a low latency storage tier, a high deduplication storage tier, a low deduplication storage tier, and a long term retention storage tier.

10. The method of claim 8, further comprising:
    initiating storing the identifier as part of an entry to the global namespace for the first backup file storing the backup data on the first node, the global namespace maintained by the clustered storage environment and storing entries for all backup files stored on the set of nodes.

11. The method of claim 8, further comprising:
determining a storage capacity of the first storage performance tier has reached a predetermined threshold;
provisioning an additional node to the first storage performance tier; and
updating the global namespace to include an additional branch of a namespace tree for the additional node without altering any existing global namespace entries for other backup files.

12. The method of claim 8, wherein providing the identifier to the clustered storage environment includes providing the identifier as an input to an operation for initiating the clustered storage environment to store the backup data, the clustered storage environment storing the identifier as an attribute of a first backup file storing the backup data on the first node within the first storage performance tier.

13. A computer program product comprising a non-transitory computer-readable medium having a computer-readable program code embodied therein to be executed by one or more processors, the program code including instructions to:
receive backup data to be stored within a clustered storage environment, the clustered storage environment comprising a set of nodes organized into a set of storage performance tiers;
assign the backup data to a first storage performance tier based on at least one of a predicted workload or a predicted storage efficiency associated with the backup data, the predicted workload or the predicted storage efficiency being determined based on attributes associated with the backup data, the attributes including at least one of type of data, access frequency, storage duration, or deduplication ratio associated with the backup data;
associate the backup data with an identifier for the first storage performance tier and provide the identifier to the clustered storage environment;
initiate the clustered storage environment to store the backup data, the clustered storage environment redirecting a write operation for the backup data to a first node within the first storage performance tier based on the identifier provided to the cluster storage environment;
redistribute a first backup file storing the backup data on the first node within the first storage performance tier to a second node within a second storage performance tier based at least one of type of data, access frequency, or storage duration of the first backup file; and
update a global namespace to associate the first backup file with the second storage performance tier without altering any existing global namespace entries for other backup files.

14. The computer program product of claim 13, wherein the set of storage performance tiers includes one or more of a low latency storage tier, a high deduplication storage tier, a low deduplication storage tier, and a long term retention storage tier.

15. The computer program product of claim 13, wherein the program code includes further instructions to:
initiate storing the identifier as part of an entry to the global namespace for the first backup file storing the backup data on the first node, the global namespace maintained by the clustered storage environment and storing entries for all backup files stored on the set of nodes.

16. The computer program product of claim 15, wherein the program code includes further instructions to:
determine a storage capacity of the first storage performance tier has reached a predetermined threshold;
provision an additional node to the first storage performance tier; and
update the global namespace to include an additional branch of a namespace tree for the additional node without altering any existing global namespace entries for other backup files.

17. The computer program product of claim 13, wherein providing the identifier to the clustered storage environment includes providing the identifier as an input to an operation for initiating the clustered storage environment to store the backup data, the clustered storage environment storing the identifier as an attribute of a first backup file storing the backup data on the first node within the first storage performance tier.

* * * * *